US008112053B2

United States Patent
Desai et al.

(10) Patent No.: US 8,112,053 B2
(45) Date of Patent: Feb. 7, 2012

(54) SHARED LNA AND PA GAIN CONTROL IN A WIRELESS DEVICE

(75) Inventors: Prasanna Desai, Olivenhain, CA (US); Mark Gonikberg, Los Altos Hills, CA (US); Brima B. Ibrahim, Aliso Viejo, CA (US); Luis Gutierrez, San Francisco, CA (US); Sreenivas Karanam, Bangalore (IN); Thomas Varghese, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 641 days.

(21) Appl. No.: 11/751,848

(22) Filed: May 22, 2007

(65) Prior Publication Data

US 2008/0293368 A1 Nov. 27, 2008

(51) Int. Cl.
*H03G 3/00* (2006.01)
*H04B 1/06* (2006.01)
(52) U.S. Cl. .................... 455/234.2; 455/234.1
(58) Field of Classification Search .................... None
See application file for complete search history.

(56) References Cited

U.S. PATENT DOCUMENTS

| 5,722,062 A * | 2/1998 | Nakanishi et al. ......... 455/247.1 |
| 2001/0041584 A1* | 11/2001 | Watanabe ..................... 455/553 |
| 2004/0162023 A1* | 8/2004 | Cho ............................. 455/41.1 |
| 2006/0035609 A1* | 2/2006 | Darabi et al. ................. 455/140 |
| 2008/0137566 A1* | 6/2008 | Marholev et al. ............ 370/310 |
| 2008/0139151 A1* | 6/2008 | Ojo et al. ................... 455/234.1 |

* cited by examiner

*Primary Examiner* — Temesgh Ghebretinsae
*Assistant Examiner* — Gennadiy Tsvey
(74) *Attorney, Agent, or Firm* — Garlick Harrison & Markison; Kevin L. Smith (57) ABSTRACT

A wireless device includes at least one antenna, a plurality of shared signal path components coupled to the at least one antenna, the plurality of shared signal path components including a shared adjustable gain element, e.g., Low Noise Amplifier (LNA), Power Amplifier (PA), etc., a first wireless interface, e.g. Wireless Local Area Network interface coupled to the plurality of shared signal path components, and a second wireless interface, e.g., Wireless Personal Area Network interface, coupled to the plurality of shared signal path components. During a first operational period, the first wireless interface controls gain of the shared adjustable gain element and during a second operational period that differs from the first operational period, the second wireless network interface controls gain of the shared adjustable gain element. With another embodiment the first wireless interface and/or the second wireless interface each includes shared adjustable gain elements for transmit and receive diversity.

16 Claims, 7 Drawing Sheets

SHARED LNA AND PA GAIN CONTROL IN A WIRELESS DEVICE

BACKGROUND

1. Technical Field

The present invention relates generally to wireless communication systems; and more particularly to gain control within a wireless device.

2. Related Art

Communication systems are well known. Communication systems include both wired communication systems and wireless communication systems. Wired communication systems include the Public Switched Telephone Network (PSTN), Wide Area Networks (WANs), Local Area Networks (LANs), and other networks that use wired or optical media for the transmission of data. Wireless communication systems include cellular telephone systems, satellite communication systems, Wireless Local Area Networks (WLANs), e.g., IEEE 802.11x network, Wireless Wide Area Networks (WWANs), e.g., WiMAX networks, Wireless Personal Area Networks (WPANs), e.g., Bluetooth and IEEE 802.15 networks, and other networks that employ a wireless link between serviced and servicing wireless devices. Of course, many communications are serviced using a combination of wireless communication systems and wired communication systems.

Network infrastructures of WWANs and WLANs include backhaul networks and a plurality of Access Points (APs). Each AP supports wireless communications within a respective service area. A WWAN AP services wireless terminals within a relatively large radius, e.g., one or more miles. WLAN APs service wireless terminals within a much smaller radius, e.g., one hundred yards or less. A WLAN, supported by one ore more WLAN APs, may service a premises such as an office complex, a coffee shop, an airport lounge, a home, etc. Wireless terminals may roam within a WLAN service area and/or from WLAN service area to WLAN service area. A WWAN service area may extend for miles and is contemplated to service lower density subscriber areas. WPANs typically service communications between wireless devices at a maximum distance of 10 feet. WPAN wireless terminals typically have the ability to establish WPAN communications with any proximate servicing host/peer device.

Many wireless devices support multiple types of wireless networks and their corresponding communication protocol interfaces. For example, one device may service both WLAN communications, e.g., IEEE 802.11x, and WPAN communications, e.g., Bluetooth, communications. Some of these communications may be serviced within a single frequency band, e.g., IEEE 802.11b/g and Bluetooth. Because communications are serviced within a single frequency band, common transmit and receive components could be used to reduce cost and complexity within the wireless device. However, the differing needs of the communication protocols generally precludes shared use. Thus, a need exists to enable shared use of signal path components in such wireless devices.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

A wireless device constructed according to the present invention includes at least one antenna, a plurality of shared signal path components coupled to the at least one antenna, the plurality of shared signal path components including at least one shared adjustable gain element. The at least one shared adjustable gain element may be a Low Noise Amplifier (LNA), a Power Amplifier (PA), or other adjustable gain device. The wireless device further includes a first wireless interface coupled to the plurality of shared signal path components and a second wireless interface coupled to the plurality of shared signal path components. During a first operational period, the first wireless interface controls gain of the at least one shared adjustable gain element and during a second operational period that differs from the first operational period, the second wireless interface controls gain of the at least one shared adjustable gain element. The first wireless interface may be a Wireless Local Area Network (WLAN) interface while the second wireless interface may be a Wireless Personal Area Network (WPAN) interface. However, the first wireless interface and the second wireless interface may both be WLAN interfaces, may both be WPAN interfaces, or may be other types of wireless interfaces.

The first wireless interface may include at least one first wireless interface adjustable gain element and the second wireless interface may include at least one second wireless interface adjustable gain element. During the first operational period, the second wireless interface may control gain of the at least one first wireless interface adjustable gain element in response to gain control of the at least one shared adjustable gain element by the first wireless interface and during the second operational period, the first wireless interface may control gain of the at least one second wireless interface adjustable gain element in response to gain control of the at least one shared adjustable gain element by the second wireless interface.

The wireless device may include a gain control arbiter coupled to the first wireless interface, to the second wireless interface, and to the plurality of shared signal path components. In such case, the gain control arbiter is operable to receive and arbitrate gain control requests from the first wireless interface and the second wireless interface and to control the at least one shared adjustable gain element based thereupon. The gain control arbiter may provide feedback to the first wireless interface and to the second wireless interface regarding arbitration decisions affecting gain of the at least one shared adjustable gain element. The teachings of the present invention will be described herein with reference to particular structures. However, the teachings of the present invention may be embodied in many differing fashions without departing from the scope of the present invention.

Figure 1:
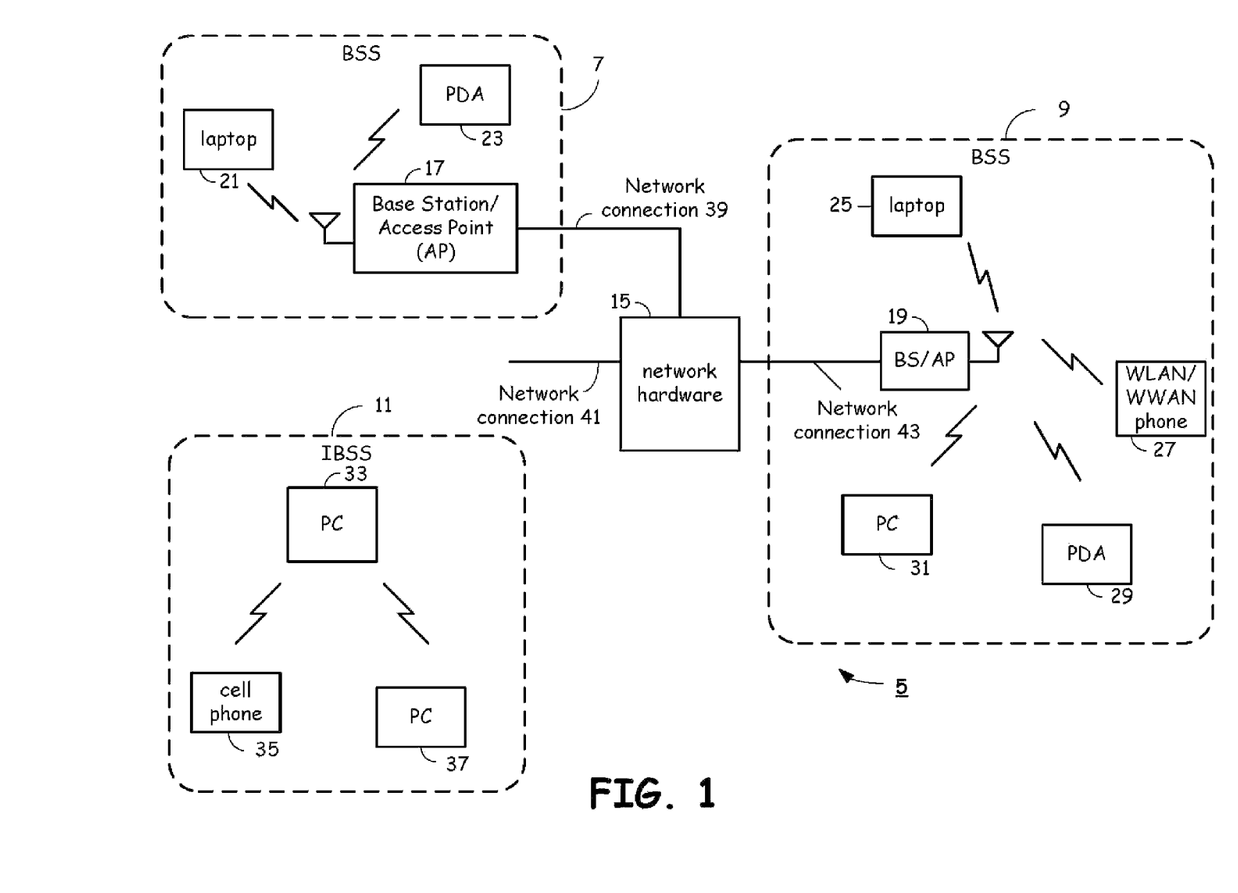
FIG. 1 is a system diagram illustrating a portion of a wireless communication system that supports wireless devices constructed and operating according to embodiments of the present invention.

FIG. 1 is a system diagram illustrating a portion of a wireless communication system that supports wireless devices constructed and operating according to embodiments of the present invention. The structure of FIG. 1 will be described herein for Wireless Local Area Networks (WLANs) and Wireless Personal Area Networks (WPANs). However, the principles of the present invention apply to other types of wireless systems as well.

Each of a plurality of service areas 7 and 9 is serviced by an Access Point (AP) 17, 19 that supports wireless communications with a plurality of wireless devices 21-23, 25-31. In supporting WLAN communications, each of the base stations 17 and 19 and/or each of the wireless devices 21-23 and 25-31 supports one or more WLAN standards such as one or more of the IEEE 802.11x standards, and may support one or more WPAN standard such as the Bluetooth standards and/or the IEEE 802.15 standards. Each AP 17 and 19 and wireless device 21-23 and 25-31 includes a built-in radio transceiver and/or is coupled to a radio transceiver to facilitate direct and/or in-direct wireless communications within the communication system 5. An IBSS 11 services a plurality of wireless devices 33-37, each of which supports a WLAN standard such as one or more of the IEEE 802.11x standards and/or a WPAN standard such as the Bluetooth standards or the IEEE 802.15 standards. The IBSS 11 supports direct communication between wireless devices 33-37 without an infrastructure AP. Each of the wireless devices 21-37 may be laptop host computers 21 and 25, personal digital assistant hosts 23 and 29, personal computer hosts 31 and 33, and/or cellular telephone hosts 27 and 35.

The APs 17 and 19 are operably coupled to network hardware 15 via network connections 39 and 43. The network hardware 15, which may be one or more of a router, switch, bridge, modem, system controller, et cetera, provides a network connection 41 for the communication system 5. Each of the APs 17, 19 has an associated antenna or antenna array to communicate with the wireless devices in its area. Typically, the wireless devices associate with a particular AP 17, 19 to receive services within the communication system 5. For direct connections (i.e., point-to-point communications) within IBSS 11, wireless devices 33-37 communicate directly via an allocated channel.

The principles of the present invention apply to each of the wireless devices 21-23, 25-29, and 33-37 as well as to each of the APs 17 and 19. Generally, according to the present invention, at least some of the wireless devices 21-23, 25-29, and 33-37 and/or at least some of the APs 17 and 19 include multiple wireless interfaces and share signal path components. These multiple wireless interfaces may be multiple WLAN interfaces, multiple WPAN interfaces, or a combination of WLAN interface(s) and WPAN interface(s). Thus, the wireless devices 21-23, 25-29, and 33-37 and/or at least some of the APs 17 and 19 service one or both of WLAN and WPAN communications and include signal paths components that are shared for use in the servicing of the communications. The principles of the present invention will be described further with reference to the particular embodiments of FIGS. 2-7.

Figure 2:
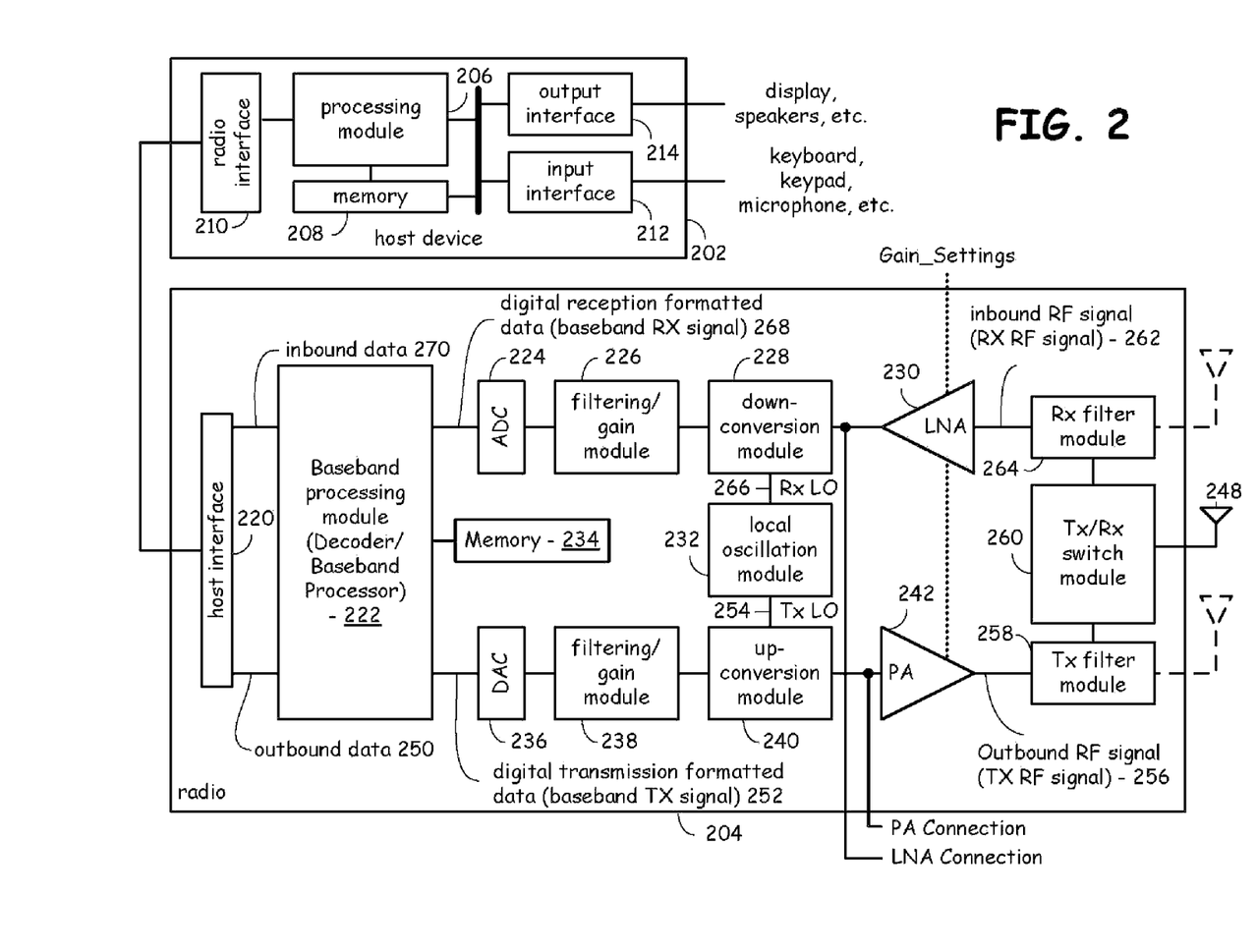
FIG. 2 is a block diagram functionally illustrating a wireless device constructed according to the present invention.

FIG. 2 is a block diagram functionally illustrating a wireless device constructed according to the present invention. The wireless device may be one of the wireless devices of FIG. 1 or one of the APs of FIG. 1. The wireless device includes host processing components 202 and an associated radio 204. With some constructs, the host processing components 202 and the radio 204 are contained within a single housing. The host processing components 202 and some or all of the components of the radio 204 may be formed on a single Integrated Circuit (IC). For personal digital assistants hosts, laptop hosts, and/or personal computer hosts, the radio 204 may reside within an expansion card or upon a mother board and, therefore, be housed separately from the host processing components 202. The host processing components 202 include at least a processing module 206, memory 208, radio interface 210, an input interface 212, and an output interface 214. The processing module 206 and memory 208 execute instructions to support host terminal functions, which may include user interface operations among other operations.

The radio interface 210 allows data to be received from and sent to the radio 204. For data received from the radio 204 (e.g., inbound data), the radio interface 210 provides the data to the processing module 206 for further processing and/or routing to the output interface 214. The output interface 214 provides connectivity to an output display device such as a display, monitor, speakers, et cetera such that the received data may be displayed. The radio interface 210 also provides data from the processing module 206 to the radio 204. The processing module 206 may receive the outbound data from an input device such as a keyboard, keypad, microphone, et cetera via the input interface 212 or generate the data itself. For data received via the input interface 212, the processing module 206 may perform a corresponding host function on the data and/or route it to the radio 204 via the radio interface 210.

Radio 204 includes a host interface 220, baseband processing module (baseband processor) 222, analog-to-digital converter 224, filtering/gain module 226, down conversion module 228, low noise amplifier 230, local oscillation module 232, memory 234, digital-to-analog converter 236, filtering/gain module 238, up-conversion module 240, power amplifier 242, RX filter module 264, TX filter module 258, TX/RX switch module 260, and antenna 248. Antenna 248 may be a single antenna that is shared by transmit and receive paths (half-duplex) or may include separate antennas for the transmit path and receive path (full-duplex). The antenna implementation will depend on the particular standard to which the wireless communication device is compliant.

The baseband processing module 222 includes one or more processing devices, some of which may be dedicated hardware components and some of which may be digital processors that execute operational instructions such as software instructions or firmware instructions. The baseband processing module 222 in combination with operational instructions stored in memory 234, execute digital receiver functions and digital transmitter functions. The digital receiver functions include, but are not limited to, digital intermediate frequency to baseband conversion, demodulation, constellation demapping, descrambling, and/or decoding. The digital transmitter functions include, but are not limited to, encoding, scrambling, constellation mapping, modulation, and/or digital baseband to IF conversion. Transmit and receive functions provided by the baseband processing module 222 may be implemented using shared processing devices and/or individual processing devices.

Processing devices, such as the baseband processing module 222, may include microprocessors, micro-controllers, digital signal processors, microcomputers, central processing units, field programmable gate arrays, programmable logic devices, state machines, logic circuitry, analog circuitry, digital circuitry, and/or any device that manipulates signals (analog and/or digital) based on operational instructions. The memory 234 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 222 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 204 receives outbound data 250 from the host processing components via the host interface 220. The host interface 220 routes the outbound data 250 to the baseband processing module 222, which processes the outbound data 250 in accordance with a particular wireless communication standard (e.g., 802.11x, 802.15, Bluetooth, et cetera) to produce digital transmission formatted data 252. The digital transmission formatted data 252 is a digital baseband signal or a digital low IF signal, where the low IF will be in the frequency range of zero to a few kilohertz/megahertz.

The digital-to-analog converter 236 converts the digital transmission formatted data 252 from the digital domain to the analog domain. The filtering/gain module 238 filters and/or adjusts the gain of the analog signal prior to providing it to the up-conversion module 240. The up-conversion module 240 directly or in a multi-step process converts the analog baseband or low IF signal into an RF signal based on a transmitter local oscillation 254 provided by local oscillation module 232. The power amplifier 242 amplifies the RF signal to produce outbound RF signal 256, which is filtered by the TX filter module 258. The TX/RX switch module 260 receives the amplified and filtered RF signal from the TX filter module 258 and provides the output RF signal 256 signal to the antenna 248, which transmits the outbound RF signal 256 to a targeted device such as a base station 15 and/or 19 (see FIG. 1).

The radio 204 also receives an inbound RF signal 262, which was received via the antenna 248, the TX/RX switch module 260, and the RX filter module 264. The low noise amplifier 230 receives the inbound RF signal 262 and amplifies the inbound RF signal 262 to produce an amplified inbound RF signal. The low noise amplifier 230 provides the amplified inbound RF signal to the down conversion module 228, which converts the amplified inbound RF signal into an inbound low IF signal or baseband signal based on a receiver local oscillation 266 provided by local oscillation module 232. The down conversion module 228 provides the inbound low IF signal (or baseband signal) to the filtering/gain module 226, which filters and/or adjusts the gain of the signal before providing it to the analog to digital converter 224.

The analog-to-digital converter 224 converts the filtered inbound low IF signal (or baseband signal) from the analog domain to the digital domain to produce digital reception formatted data 268. The baseband processing module 222 demodulates, demaps, descrambles, and/or decodes the digital reception formatted data 268 to recapture inbound data 270 in accordance with the particular wireless communication standard being implemented by radio 204. The host interface 220 provides the recaptured inbound data 270 to the host processing components 202 via the radio interface 210.

As the reader will appreciate, all components of the radio 204, including the baseband processing module 222 and the RF front end components may be formed on a single integrated circuit. In another construct, the baseband processing module 222 and the RF front end components of the radio 204 may be formed on separate integrated circuits. The radio 204 may be formed on a single integrated circuit along with the host processing components 202. In still other embodiments, the baseband processing module 222 and the host processing components 202 may be formed on separate integrated circuits. Thus, all components of FIG. 2 excluding the antenna, display, speakers, et cetera and keyboard, keypad, microphone, et cetera may be formed on a single integrated circuit. Many differing constructs integrated circuit constructs are possible without departing from the teachings of the present invention.

According to the present invention, the radio 204 includes a PA connection and a LNA connection that are accessible external to the radio 204 and that may be employed to couple signals to and from another radio of a wireless device constructed according to one or more embodiments of the present invention. Embodiments of structures of the present invention that employ this signal sharing construction are described further with reference to FIGS. 3, 4, and 6. Further, according to embodiments of the present invention, the LNA 230 and PA 242 may include gain control inputs that are accessible external to the radio 204. Embodiments of operations of the present invention that employ this shared signal structure will be described further with reference to FIGS. 5 and 7.

Figure 3:
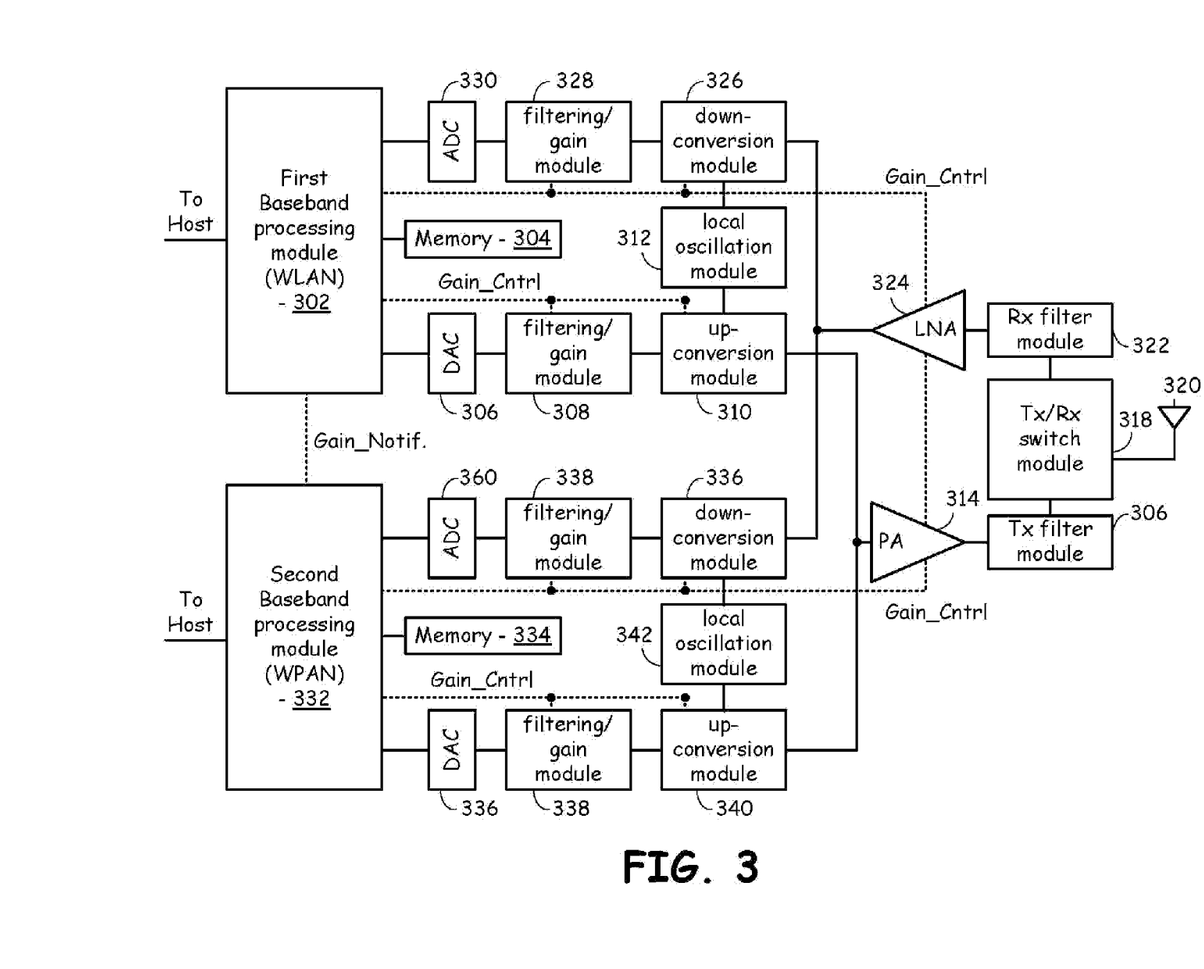
FIG. 3 is a block diagram functionally illustrating a wireless device constructed according to a first embodiment of the present invention.

FIG. 3 is a block diagram functionally illustrating a wireless device constructed according to a first embodiment of the present invention. Components having names to corresponding components of FIG. 2 have similar functionalities to the similarly-named components of FIG. 2. However, some similarly-named components of FIG. 3 and their related interconnectivity may differ from components having similar names described with reference to FIG. 2.

Components of the wireless device illustrated in FIG. 3 includes generally a first wireless interface, e.g., a WLAN interface, a second wireless interface, e.g., a WPAN interface, and shared signal path components. Description of embodiments of the present invention will consider particularly a wireless device having one WLAN interface and one WPAN interface. However, the reader must understand in reading the descriptions of the embodiments discussed herein that the first and second wireless interfaces are not limited to these particular types of wireless interfaces and that the principles of the present invention apply to wireless devices and methods of operation that employ differing wireless interfaces as well. For example, in other embodiments, the first and second wireless interfaces could both be WLAN interfaces, could be both WPAN interfaces, or could be multiple types or combinations of other types of interfaces. Further, the number of wireless interfaces having shared signal components according to the present invention could be a greater number than two, e.g., three wireless interfaces, four wireless interfaces. etc.

The wireless device includes at least one antenna 320 and a plurality of signal path components that couple to the at least one antenna 320. These plurality of shared signal path components include TX/RX switch module 318, RX filter module 322, TX filter module 306, LNA 324, and PA 14. As shown the plurality of shared signal path components couple to both the WLAN interface and to the WPAN interface. The WLAN interface includes a first baseband processing module 302, memory 304, DAC 306, filtering/gain module 308, up-conversion module 310, local oscillation module 312, down-conversion module 326, filtering/gain module 328, and ADC 330. These components of the WLAN interface have similar structured operations to similar components described previously with reference to FIG. 2. The WPAN interface includes second baseband processing module 332, memory 334, DAC 336, filtering/gain module 338, up-conversion module 340, local oscillation module 342, down-conversion module 336, filtering/gain module 338, and ADC 360. The structured operations of the components of the WPAN interface have same/similar operations to those similar named components previously described with reference to FIG. 2. Generally, the WLAN interface supports a WLAN communication protocol such as an IEEE 802.11a, IEEE 802.11b, IEEE 802.11g, etc. communication protocol standard while the WPAN interface supports a WPAN communication protocol such as the Bluetooth communication standard and/or the IEEE 802.15 communication protocol standard.

According to one aspect of the present invention, the WLAN interface and the WPAN interface both use the shared signal path components for transmit and receive operations. In some operations, the WLAN interface and WPAN interface receive information concurrently. Further, in other operations, both the WLAN interface and the WPAN interface transmit information concurrently. In still other operations, one of the WLAN interface and the WPAN interface is transmitting at one time while the other of the WLAN interface or the WPAN interface receive information at that time. Thus, the shared signal path components of the wireless device of FIG. 3 may be shared in many differing ways by the WLAN interface and the WPAN interface.

According to another aspect of the present invention, gain control of the LNA 324 and the PA 314 of the shared signal path components is controlled by one of the WLAN interface and the WPAN interface. According to this aspect of the embodiment of FIG. 3, during a first operational period, the WLAN interface controls LNA 324 gain. Further, during a second operational period that differs from the first operational period, the WPAN interface controls LNA 324 gain.

According to another aspect of the present invention, the WLAN interface includes at least one adjustable gain element in its receive signal path, e.g., down-conversion module 326 and/or filtering/gain module 328. Further, the WPAN interface includes at least one adjustable gain element in its receive path, e.g., down-conversion module 336 and/or filtering/gain module 338. According to this aspect of the present invention, in the first operational period, the WPAN interface, e.g., second baseband processing module 332, controls gain of its at least one adjustable gain element 336 and 338 in response to LNA gain control of the WLAN, interface, e.g., gain control by first baseband processing module 302. With these operations, because the WPAN interface does not have control of LNA 324 gain, the WPAN interface compensates for this lack of gain control by adjusting the gain of its at least one adjustable gain element 336 and 338.

Further, during a second operational period, the WLAN interface, e.g., first baseband processing module 302 controls the gain of its at least one adjustable gain element 326 and 328 in its receive path in response to LNA 324 gain control of the WPAN interface, e.g., second baseband processing module 332. In coordinating the control of the gain of LNA 324, the first baseband processing module 302 and the second baseband processing module 332 may exchange gain notification signals to indicate particular LNA 324 gain settings that are applied by a controlling one of the baseband processing modules 302 or 332. For example, the gain notification may indicate a gain setting for LNA 324 by baseband processing module 302 during the first operational period or a gain setting for LNA 324 by baseband processing module 332 during the second operational period. Such gain notification may indicate that the controlling baseband processing module 302 or 332 intends to increase or decrease LNA 324 gain. In such case, the non-controlling baseband processing module 302 or 332 may alter gain of its adjustable gain elements in the receive path to compensate for an impending change in LNA 324 gain.

According to another aspect of the present invention, during a third operational period, the WLAN interface controls PA 314 gain. Further, during a fourth operational period, the WPAN interface controls PA 314 gain. In such case, the fourth operational period differs from a third operational period. With this as an aspect of the present invention, the WLAN interface includes at least one adjustable gain element in its transmit path, e.g., filtering/gain module 308 and/or up-conversion module 310. The first baseband processing module 302 provides gain control settings to the filtering/gain module 308 and to the up-conversion module 310. According to this aspect of the present invention as well, second baseband processing module 332 has control of WPAN adjustable gain elements on the transmit path that may include filtering/gain module 338 and/or up-conversion module 340. Further, the second baseband processing module 332 provides a gain control signal to PA 314 so that it may control the gain at PA 314 during the fourth operational period.

According to this aspect of the present invention, during the third operational period, the WLAN interface controls PA 314 gain while the WPAN interface controls gain of its at least one adjustable gain element 338 and/or 340 in response to PA 314 gain control of the WLAN interface. Further, during the fourth operational period that differs from the third operational period, the WPAN interface controls PA 314 gain and the WLAN interface controls gain of its at least one adjustable gain element 308 and 310 in response to PA 314 gain control by the WPAN interface. As was the case with the gain control of LNA 324, gain notification signals are passed between first baseband processing modules 302 and second baseband processing modules 332 to indicate not only a level of gain of the PA 314 but of the impending gain changes by the controlling baseband processing. Further, with LNA 324 gain control, the rate at which the gain of the PA 314 may be altered is limited so that the non-controlling baseband processing module may control gain of its at least one adjustable gain element to adequately compensate for changes in PA 314 gain.

Figure 4:
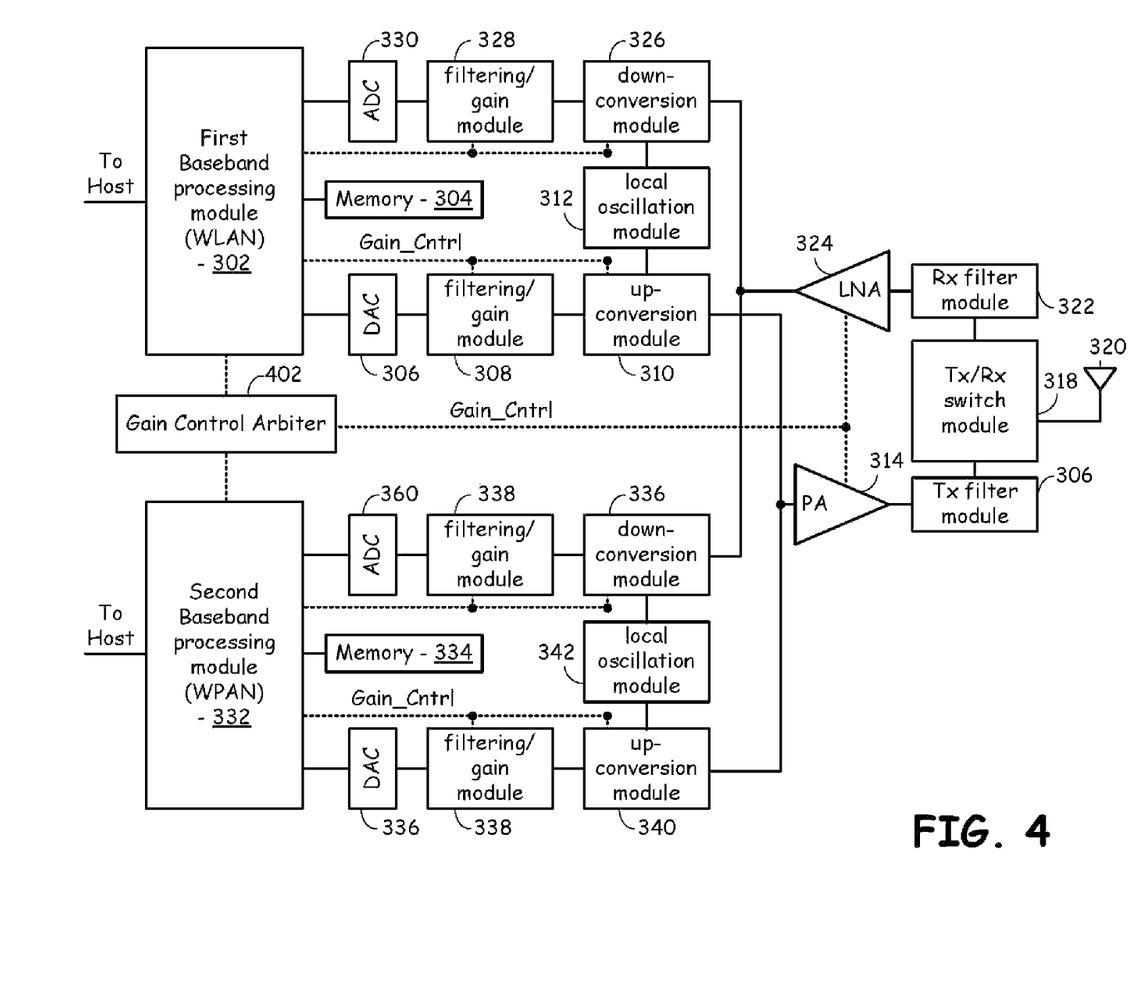
FIG. 4 is a block diagram functionally illustrating a wireless device constructed according to a second embodiment of the present invention.

FIG. 4 is a block diagram functionally illustrating a wireless device constructed according to a second embodiment of the present invention. The structure of the wireless device of FIG. 4 differs from the structure of FIG. 3. Further, as was previously described, the first wireless interface and the second wireless interface, in other embodiments, may be other than a WLAN interface and a WPAN interface.

The wireless device of FIG. 4 includes a gain control arbiter that receives information from first baseband processing module 302 and second baseband processing module 332. Further, the gain control arbiter 402 provides feedback to the first baseband processing module 302 and to the second baseband processing module 332 regarding arbitration decisions effecting LNA 324 gain and/or PA 314 gain. When one of the first baseband processing modules 302 of the WLAN interface or the second baseband processing module 332 of the WPAN interface desires to control gain of the LNA 324 or PA 314, the respective baseband processing module 302/332 sends a request for gain control to the gain control arbiter 402. The gain control arbiter 402, based upon received signals from one or both of the baseband processing modules 302 and 332 determines which of the baseband processing modules 302 or 332 will have control of LNA 324 gain and/or PA 314 gain. Then, the gain control arbiter 402 provides feedback to the baseband processing module 302 of the WLAN interface and to the baseband processing module 332 of the WPAN interface regarding arbitration decisions effecting either or both of the LNA 324 gain and the PA 314 gain. Thus, as contrasted to the structure of FIG. 3, an intermediate device, the gain control arbiter 402 performs gain control processing operations according to the present invention.

Referring to both FIG. 3 and FIG. 4, the principles of the present invention could apply to other variations and structure. For example, a single baseband processing module could service both the WLAN interface and the WPAN interface. In such case, the baseband processing module would couple to both the WLAN and WPAN shared signal path components. In such case, since a single baseband processing module would service both the WLAN interface and the WPAN interface, it alone could determine LNA 324 and PA 314 gain control. However, the selected gain would correspond to some degree to one of WLAN or WPAN operations.

Figure 5:
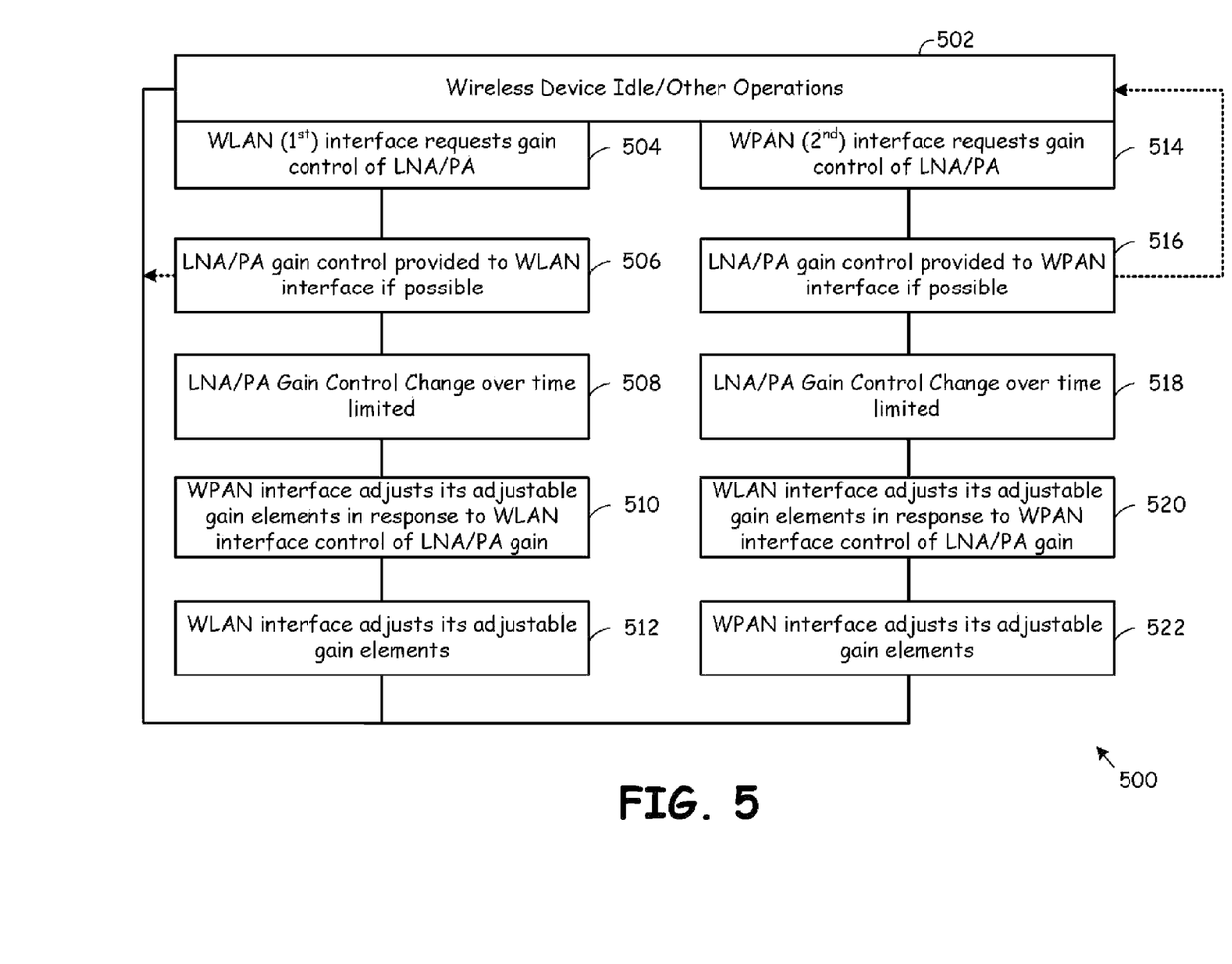
FIG. 5 is a flow chart illustrating operations of a wireless device according to one or more embodiments of the present invention.

FIG. 5 is a flow chart illustrating operations of a wireless device according to one or more embodiments of the present invention. As a starting operation, the operation 500 of the wireless device resides in an idle operation or services other operations not relating to the present invention (Step 502). In a first operation according to the present invention, the first wireless interface, e.g., WLAN interface, requests gain control of the LNA or the PA of a shared signal path (Step 504). Then, the LNA or PA gain control is provided to the WLAN interface if possible (Step 506). Gain control may be provided to the WLAN interface at Step 506 based upon interaction between a baseband processing module servicing the WLAN interface 302 and a baseband processing module 332 servicing the second wireless interface, e.g., WPAN interface. Alternatively, control of LNA or PA gain may be provided by the gain control arbiter 402 illustrated in FIG. 4.

If the WLAN interface is not provided with its desired LNA or PA gain control, operation returns to Step 502. However, if the WLAN interface is given LNA or PA gain control, according to one aspect of the present invention, the LNA/PA gain control change is limited over time (Step 508). Further, in response to the WLAN interface having LNA/PA gain control, the WPAN interface controls its adjustable gain elements in response to the WLAN control of the LAN/PA (Step 510). Further, the WLAN interface may control its adjustable gain element based upon its requested and provided LNA/PA gain control settings (Step 512). From Step 512, operation returns to Step 502.

According to another aspect of the method 500 of FIG. 5, the WPAN interface may request gain control of the LNA or PA of the shared signal path components of the wireless device (Step 514). In response to this request made at Step 514, the LNA/PA gain control may be provided to the WPAN interface if possible (Step 516). As was the case with the operation of Step 506, the WPAN interface may be provided with LNA/PA gain control via interaction with the WLAN interface or based upon operation of a gain control arbiter if one is present. If the WPAN interface is not provided with gain control, operation returns to step 502. With the WPAN interface having LNA/PA gain control, the rate at which the gain of the LNA/PA may change over time is limited so that the non-controlling WLAN interface can react to any gain changes (Step 518). Then, the WLAN interface adjusts its adjustable gain element in response to the WPAN interface having control of LNA/PA gain (Step 520). Further, the WPAN interface may adjust the gain and the adjustable gain elements in response to its requested and secured gain setting of the LNA/PA (Step 522). From Step 522, operation proceeds to Step 502.

Figure 6:
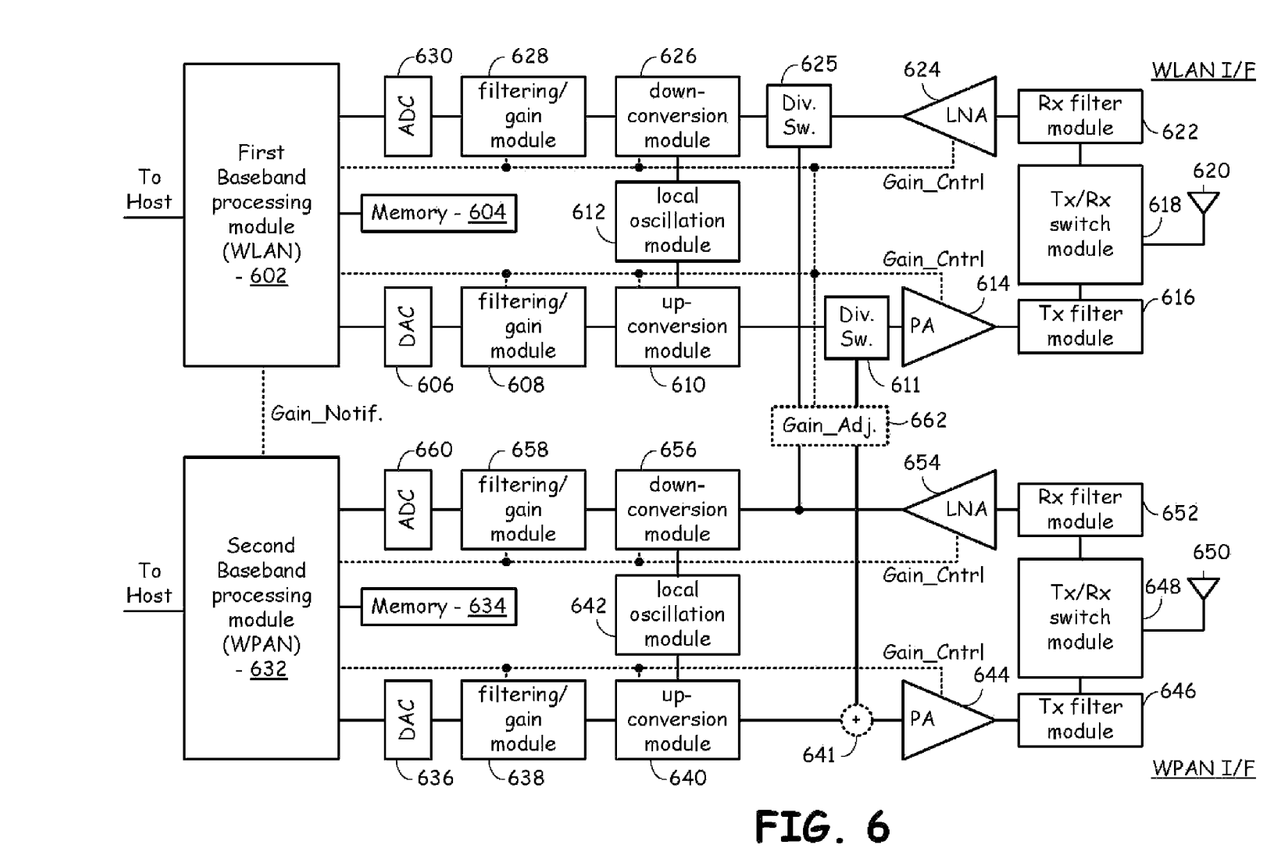
FIG. 6 is a block diagram functionally illustrating a wireless device constructed according to a third embodiment of the present invention.

FIG. 6 is a block diagram functionally illustrating a wireless device constructed according to a third embodiment of the present invention. Various components of FIG. 6 have similar names and structures as those previously described with reference to FIGS. 2, 3 and 4. The structure and operation of these components is generally the same as those previously described although the components of FIG. 6 may have different communication connectivity. Generally, the wireless device of FIG. 6 includes a first wireless interface, e.g., WPAN interface, and a second wireless interface, e.g., WLAN interface. Of course, in other embodiments of the present invention, these wireless interfaces may be other than a WLAN interface and a WPAN interface.

The WPAN interface includes WPAN processing circuitry (second baseband processing module) 632, a WPAN receive path, a WPAN transmit path, a TX/RX switch module 648, and at least one antenna 650. The WPAN receive path includes an RX filter module 652, WPAN LNA 654, down-conversion module 656, filtering/gain module 658, and ADO 660. The WPAN transmit path includes DAC 636, filtering/gain module 638, up-conversion module 640, adder 641, WPAN PA 644, TX filter module 646, and TX/RX switch module 648. The at least one antenna 650 couples to the WPAN receive path and to the WPAN transmit path via the TX/RX switch module 648. The WPAN interface further includes memory 634 and local oscillation module 642.

WLAN interface includes WLAN processing circuitry (first baseband processing module) 602, WLAN receive path, WLAN transmit path, TX/RX switch 618, and at least one antenna 620. The WLAN receive path includes RX filter module 622, WLAN LNA 624, diversity switch 625, down-conversion module 626, filtering/gain module 628, and ADC 630. The WLAN transmit path includes DAC 606 filtering/gain module 608, up-conversion module 610, diversity switch 611, WLAN PA 614, and TX filter module 616. The WLAN interface further includes memory 604, local oscillation module 612 and the least one antenna 620 that couples to the WLAN transmit path and to the WLAN receive path via the TX/RX switch module 618.

According to the present invention, the WLAN receive path couples to the WPAN LNA 654 via diversity switch 625 and gain adjustment circuitry 662. Further, the WLAN transmit path selectively couples to the WPAN PA 644 via diversity switch 611, gain adjustment circuitry 662, and adder 641. In some receive operations, the WLAN receive path receives signals from both WLAN LNA 624 and WPAN LNA 654. During receipt of signals from both WLAN LNA 624 and WPAN LNA 654, the WLAN interface may gain adjust the receive signal coupled from WPAN LNA 654 of the gain adjustment circuitry 662. Further, in some transmit operations, the WLAN interface couples transmit signals to both WLAN PA 614 and WPAN PA 644 via diversity switch 611, gain adjustment circuitry 662, and adder 641. The WLAN interface supports both transmit and receive diversity using signal path components of the WPAN interface. Even though the WLAN interface does not have gain control of the WPAN LNA 654 or the WPAN PA 644, the WLAN interface achieves diversity in both transmit and receive operations by using such elements of the WPAN interface. Such diversity in transmission and receipt may cause minimized interference with ongoing WPAN communications if particular channel(s)

used by the WLAN interface does not coincide with particular channel(s) used by the WPAN interface. An example of such scenario would occur when the WLAN interface and WPAN interface use different hopping sequences so that no concurrent use of particular channels within a shared frequency spectrum occurs. However, in some cases, there may be short term conflict between used portions of the frequency spectrum between the WLAN interface and the WPAN interface.

Because the WPAN interface has the control of gain of the WPAN LNA 654 and WPAN PA 644, the WLAN interface may use the gain adjustment circuitry 662 to gain adjust both a receive signal and a transmit signal to cause cooperative operation between the WLAN interface and the WPAN interface. Such gain control would be provided by the first baseband processing module 602. Further, the first baseband processing modules 602 may provide gain control to any or all of the gain adjustable elements 628, 626, 608, 610 and to gain adjustable element 624 and PA 614 to compensate for differences in gain between the WPAN interface and the WLAN interface.

Figure 7:
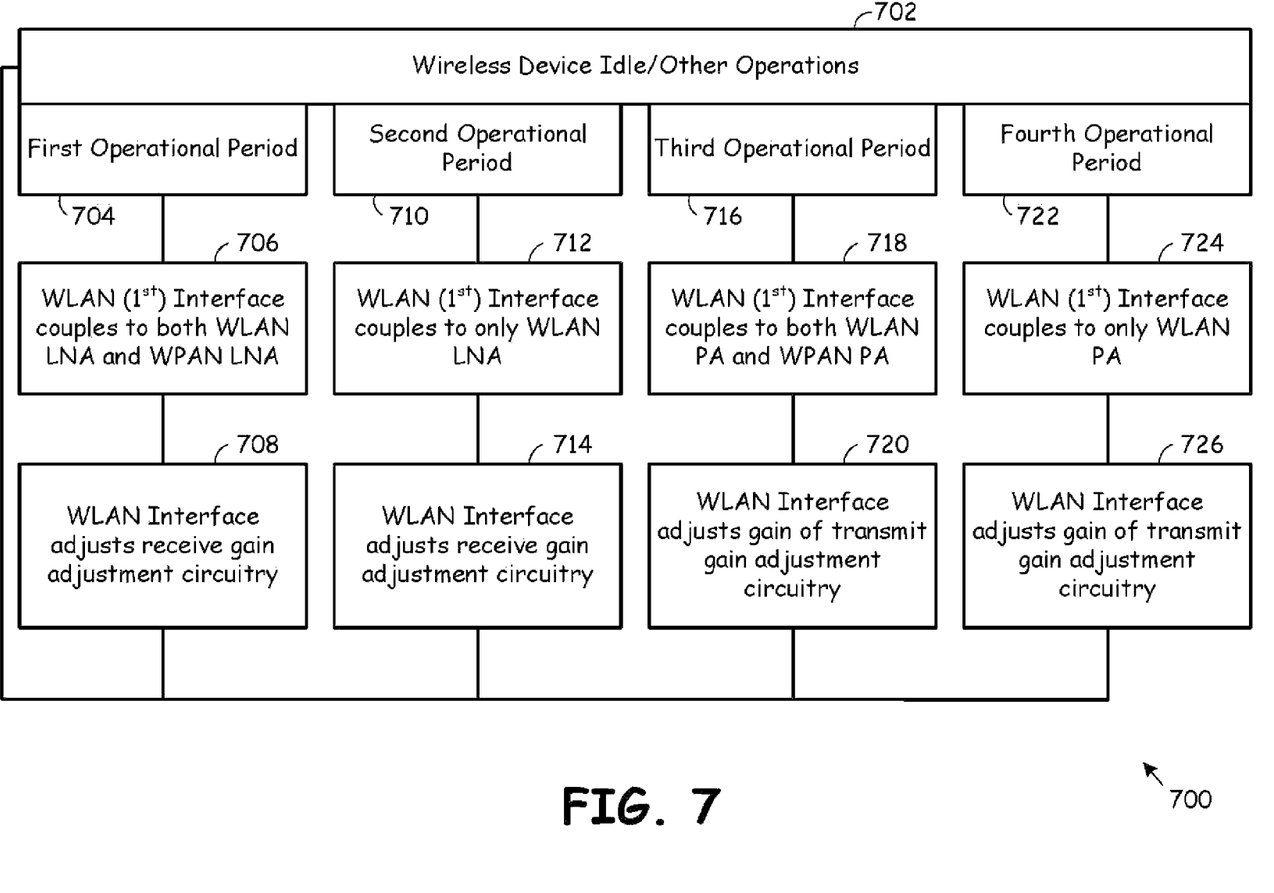
FIG. 7 is a flow chart illustrating operations of a wireless device according to one or more alternate embodiments of the present invention.

FIG. 7 is a flow chart illustrating operations of a wireless device according to one or more alternate embodiments of the present invention. Operation 700 of a wireless device having structure similar or same as the structure of the wireless device illustrated in FIG. 6 is described with reference to FIG. 7. Operation of the wireless device remains in idle mode when performing other operations not related to the present invention (Step 702). Operation from Step 702 may proceed to any of four different operational periods. These four operational periods while being shown separately with respect to the operations of 700 of FIG. 7 may in some cases overlap with one another. During a first operational period (Step 704), a first wireless interface, e.g., a WLAN interface, couples to both WLAN LNA and to a second wireless interface, e.g., WPAN interface, LNA (Step 706). In such case, the WLAN interface adjusts receive gain adjustment circuitry to compensate for its coupling to both WLAN LNA and WPAN LNA (Step 708). In such case, the WLAN interface may adjust the gain of its WLAN LNA to compensate for the additional signal it receives from the WPAN LNA. From Step 708, operation returns to Step 702.

During a second operational period that differs from the first operational period (Step 710) the WLAN interface couples a receive signal from only WLAN LNA (Step 712). In such case, the WLAN interface does not receive signal from both the WLAN LNA and the WPAN LNA. The WLAN interface adjusts its receive gain adjustment circuitry and the gain of the WLAN LNA (Step 714). From Step 714 operation proceeds to Step 702.

During a third operational period (Step 716), the WLAN interface couples to both the WLAN PA and to the WPAN PA (Step 718). The third operational period may coincide with the first operational period, the second operational period or to neither the first or second operational periods. During this third operational period, the WLAN interface adjusts the gain of its transmit gain adjustment circuitry and of the WLAN PA based upon its coupling of signal to both the WLAN PA and to the WPAN PA (Step 720). From Step 720 operation proceeds to Step 702.

Finally, during a fourth operational period that differs from the third operational period (Step 722), the WLAN interface couples to only the WLAN PA (Step 724). In such case, the WLAN interface does not couple any transmit signals to the WPAN PA. In such case, the WLAN interface adjusts the gain of transmit gain adjustment circuitry (Step 726). Further, the WLAN interface would also adjust the gain of its WLAN PA. The fourth operational period (Step 722) may correspond to first operational period at Step 704, second operational period at Step 710 or neither of these two operational periods.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A wireless device comprising:
   at least one antenna;
   a plurality of shared signal path components coupled to the at least one antenna, the plurality of shared signal path components including a Low Noise Amplifier (LNA);
   a first wireless interface coupled to the plurality of shared signal path components;
   a second wireless interface coupled to the plurality of shared signal path components;
   a gain control arbiter coupled to the first wireless interface, to the second wireless interface, and to the plurality of shared signal path components, the gain control arbiter operable to receive and arbitrate LNA gain control requests from the first wireless interface and the second wireless interface and to control LNA gain based thereupon;

wherein during a first operational period, the first wireless interface controls LNA gain of the LNA via gain control settings; and wherein during a second operational period that differs from the first operational period, the second wireless interface controls the LNA gain of the LNA via the gain control settings.

2. The wireless device of claim 1, wherein:
the first wireless interface comprises a Wireless Local Area Network (WLAN) interface; and
the second wireless interface comprises a Wireless Personal Area Network (WPAN) interface.

3. The wireless device of claim 1, wherein:
the first wireless interface includes at least one adjustable gain element;
the second wireless interface includes at least one adjustable gain element;
during the first operational period, the second wireless interface controls gain of its at least one adjustable gain element in response to LNA gain control of the first wireless interface; and
during the second operational period, the first wireless interface controls gain of its at least one adjustable gain element in response to LNA gain control of the second wireless interface.

4. The wireless device of claim 1, wherein the gain control arbiter provides feedback to the first wireless interface and to the second wireless interface regarding arbitration decisions affecting LNA gain.

5. The wireless device of claim 1, wherein:
the plurality of shared signal path components further comprise a Power Amplifier (PA);
the first wireless interface includes at least one adjustable gain element;
the second wireless interface includes at least one adjustable gain element;
during a third operational period, the second wireless interface controls gain of its at least one adjustable gain element in response to PA gain control of the first wireless interface; and
during a fourth operational period that differs from the third operational period, the first wireless interface controls gain of its at least one adjustable gain element in response to PA gain control of the second wireless interface.

6. The wireless device of claim 1, wherein the gain control arbiter provides feedback to the first wireless interface and to the second wireless interface regarding arbitration decisions affecting PA gain.

7. A method for operating a wireless device that includes a least one antenna, a plurality of shared signal path components including a Low Noise Amplifier (LNA) coupled to the at least one antenna, a first wireless interface coupled to the plurality of shared signal path components, and a second wireless interface coupled to the plurality of shared signal path components, the method comprising:
during a first operational period, the first wireless interface controlling LNA gain of the LNA via gain control settings;
during a second operational period that differs from the first operational period, the second wireless interface controlling the LNA gain of the LNA via the gain control settings; and arbitrating LNA gain control requests received from the first wireless interface and the second wireless interface; and
controlling LNA gain based upon the LNA gain control requests.

8. The method of claim 7, wherein:
the first wireless interface comprises a Wireless Local Area Network (WLAN) interface; and
the second wireless interface comprises a Wireless Personal Area Network (WPAN) interface.

9. The method of claim 7, wherein the first wireless interface includes at least one adjustable gain element and the second wireless interface includes at least one adjustable gain element and the method further comprises:
during the first operational period, the second wireless interface controlling gain of its at least one adjustable gain element in response to a LNA gain setting of the first wireless interface; and
during the second operational period, the first wireless interface controlling gain of its at least one adjustable gain element in response to a LNA gain setting of the second wireless, interface.

10. The method of claim 7, further comprising providing feedback to the first wireless interface and to the second wireless interface regarding arbitration decisions affecting LNA gain control.

11. The method of claim 7, further comprising:
during a third operational period, the first wireless interface controlling gain of a PA of the shared signal shared path components and the second wireless interface controlling gain of its at least one adjustable gain element in response to a PA gain control setting of the gain control settings of the first wireless interface; and
during a fourth operational period that differs from the third operational period, the second wireless interface controlling gain of the PA and the first wireless interface controlling gain of its at least one adjustable gain element in response to a PA gain control setting of the gain control settings of the second wireless interface.

12. A wireless device comprising:
at least one antenna;
a plurality of shared signal path components coupled to the at least one antenna, the plurality of shared signal path components including at least one shared adjustable gain element;
a first wireless interface coupled to the plurality of shared signal path components;
a second wireless interface coupled to the plurality of shared signal path components;
a gain control arbiter coupled to the first wireless interface, to the second wireless interface, and to the plurality of shared signal path components, the gain control arbiter operable to receive and arbitrate gain control requests from the first wireless interface and the second wireless interface and to control the plurality of shared signal path components;
wherein during a first operational period, the first wireless interface controls gain of the at least one shared adjustable gain element via gain control settings; and
wherein during a second operational period that differs from the first operational period, the second wireless interface controls gain of the at least one shared adjustable gain element via the gain control settings.

13. The wireless device of claim 12, wherein:
the first wireless interface comprises a Wireless Local Area Network (WLAN) interface; and the second wireless interface comprises a Wireless Personal Area Network (WPAN) interface.

14. The wireless device of claim 12, wherein the gain control arbiter provides feedback to the first wireless interface and to the second wireless interface regarding arbitration decisions affecting gain of the at least one shared adjustable gain element.

15. A method for operating a wireless device that includes a least one antenna, a plurality of shared signal path components including at least one shared adjustable gain element, a first wireless interface coupled to the plurality of shared signal path components, and a second wireless interface coupled to the plurality of shared signal path components, the method comprising:

during a first operational period, the first wireless interface controlling gain of the at least one shared adjustable gain element via gain control settings;

during a second operational period that differs from the first operational period, the second wireless interface controlling gain of the at least one shared adjustable gain element via the gain control settings;

arbitrating gain control requests received from the first wireless interface and the second wireless interface;

controlling gain of the at least one shared adjustable gain element based upon the gain control requests; and providing feedback to the first wireless interface and to the second wireless interface regarding arbitration decisions affecting gain control of the at least one shared adjustable gain element.

16. The method of claim 15, wherein:

the first wireless interface comprises a Wireless Local Area Network (WLAN) interface; and the second wireless interface comprises a Wireless Personal Area Network (WPAN) interface.

\* \* \* \* \*

UNITED STATES PATENT AND TRADEMARK OFFICE
CERTIFICATE OF CORRECTION

| | | |
|---|---|---|
| PATENT NO. | : 8,112,053 B2 | Page 1 of 1 |
| APPLICATION NO. | : 11/751848 | |
| DATED | : February 7, 2012 | |
| INVENTOR(S) | : Prasanna Desai et al. | |

It is certified that error appears in the above-identified patent and that said Letters Patent is hereby corrected as shown below:

In the Claims

Col. 13, line 54, in claim 7: replace "includes a" with --includes at--
Col. 14, line 23, in claim 9: replace "wireless, interface" with --wireless interface--
Col. 15, line 9, in claim 15: replace "a least one" with --at least one--

Signed and Sealed this
Fourteenth Day of May, 2013

Teresa Stanek Rea
*Acting Director of the United States Patent and Trademark Office*